(12) United States Patent
Owens et al.

(10) Patent No.: US 6,415,150 B1
(45) Date of Patent: Jul. 2, 2002

(54) SYSTEM AND METHOD FOR PROVIDING TELECOMMUNICATIONS SERVICE USING A WIRELESS LINK

(75) Inventors: Michael Kevin Owens, Cary, IL (US); Dennis Aldon Carpenter, Menomonee Falls, WI (US)

(73) Assignee: Ameritech Corporation, Hoffman Estates, IL (US)

(*) Notice: Subject to any disclaimer, the term of this patent is extended or adjusted under 35 U.S.C. 154(b) by 0 days.

(21) Appl. No.: 09/151,882

(22) Filed: Sep. 11, 1998

(51) Int. Cl.[7] .................................................. H04Q 7/20
(52) U.S. Cl. ............................ 455/445; 455/560; 455/7; 455/554
(58) Field of Search ................................. 455/445, 560, 455/7, 14, 15, 554, 555, 414; 379/56.1, 56.2, 56.3

(56) References Cited

U.S. PATENT DOCUMENTS

| | | |
|---|---|---|
| 3,778,555 A | 12/1973 | Nordling et al. |
| 3,823,401 A | 7/1974 | Berg et al. |
| 3,824,597 A | 7/1974 | Berg |
| 4,393,491 A | 7/1983 | Ashlock et al. |
| 4,528,656 A * | 7/1985 | Morias ........................ 370/30 |
| 4,625,308 A | 11/1986 | Kim et al. |
| 4,924,496 A | 5/1990 | Figa et al. |
| 5,463,671 A | 10/1995 | Marsh et al. |
| 5,467,385 A | 11/1995 | Reuben et al. |
| 5,546,447 A | 8/1996 | Skarbo et al. |
| 5,566,235 A | 10/1996 | Hetz |
| 5,572,576 A | 11/1996 | Klausner et al. |
| 5,594,784 A | 1/1997 | Velius |
| 5,623,537 A | 4/1997 | Ensor et al. |
| 5,651,054 A | 7/1997 | Dunn et al. |
| 5,664,009 A | 9/1997 | Hurst et al. |
| 5,692,038 A | 11/1997 | Kraus et al. |
| 5,706,334 A | 1/1998 | Balk et al. |
| 5,963,864 A * | 10/1999 | O'Neill et al. ............... 455/445 |
| 6,014,546 A * | 1/2000 | Georges et al. ............... 455/3.1 |
| 6,101,174 A * | 8/2000 | Langston ..................... 370/312 |
| 6,115,603 A * | 9/2000 | Baird et al. .................. 455/414 |

OTHER PUBLICATIONS

N. Palmer, "The Wireless Local Loop A Matter of Simple Economics", *The Wireless Local Loop,* Jun. 3, 1996 from the World Wide Web, printed Nov. 4, 1997.
K. Pyle, "Local Loop Solutions for a Multiple Media World" *Loop Solutions,* May 26, 1997 from the World Wide Web, printed Nov. 6, 1997.
B–CDMA WLL from the World Wide Web at http://samsungelectronics.com/product/hotproduct/cdma/bcdma.htm printed Nov. 4, 1997.
Siemens, "Radio: An Alternative for the Loop" from the World Wide Web printed Nov. 4, 1997.
DSC Communications, "Fixed Wireless Access" from the World Wide Web at http://www.dsccc.com/airspn.hmt printed on Nov. 4, 1997.
"UMC 1000 Fact Sheet" from the World Wide Web at http://www.fibre.com/products/factsheet.htm printed Nov. 4, 1997.
M. Posey, "Purchasing Patterns—When a Line is not a Line" from the World Wide Web printed on Nov. 4, 1997.
"The Quadhopper™" from the World Wide Web at http://www.laruscorp.com/prodradi.htm printed on Nov. 5, 1997.

\* cited by examiner

*Primary Examiner*—Daniel Hunter
*Assistant Examiner*—Lana Le
(74) *Attorney, Agent, or Firm*—Brinks Hofer Gilson & Lione

(57) ABSTRACT

A system and method for providing telecommunications service to users in a service area using a wireless link. An office-side connection system is provided for connecting a local distribution system to the central office switch. The local distribution system includes a cross-connect system and a radio for linking to a second local distribution system. The second distribution system includes subscriber connections for connecting to the user telecommunications devices. The radio may be enclosed in a hut or cabinet with the cross-connect system. The radio may also be enclosed in a hut while the cross-connect system is enclosed in a cabinet. The radio may be temporary to provide a temporary radio link until a permanent optical or copper cable can replace the radio.

19 Claims, 7 Drawing Sheets

SYSTEM AND METHOD FOR PROVIDING TELECOMMUNICATIONS SERVICE USING A WIRELESS LINK

BACKGROUND OF THE INVENTION

A. Field of the Invention

This invention relates to telecommunications systems and more particularly to systems for connecting users in a service area to telecommunications service.

B. Description of Related Art

Growing cities and towns or new towns in rural areas require an infrastructure of basic services. One such service is telephone service. To provide the infrastructure for telephone service, telephone service providers deploy copper or fiber-optic cable from a central office (CO) to the customer locations and build any structures associated with deployment of the cable.

Telephone service providers typically deploy the cable by connecting cables having successively lower capacities between the CO and the customer location. Cables with a first capacity, such as for example, DS3 cable, is deployed between a CO and a service area interface. A DS3 cable can carry a DS3 signal, which is a digital telephone signal that transmits at 44.736 Mbs. A DS3 cable is capable of carrying 672 pulse code modulation (PCM) voice channels. At the service area interface, the DS3 cable may be divided into several cables, which can carry 96 voice channels, or DS1 cables, which can carry 24 voice channels. The lower capacity cables branch out from the service area interface to different areas such that each DS1 cable serves a group of customers. DS1 cables extend to a terminal from which drops are made to a network interface at a customer's location.

The DS1 signals can be carried on either optical or copper cables. DS3 signals are carried by optical cables. Signals having higher capacities may be carried by optical, coaxial or by radio or wave-guides.

Prior to the use of optical cable, radio was historically used for inter-office trunking because of its capacity and to take advantage of the central office structure, which provided environmentally controlled conditions. The high density traffic carried over inter-office/ trunking justifies the cost of using radio, particularly in mountainous or otherwise harsh environments where installing cable would be more expensive.

The cables are typically buried, or carried in underground conduits, although copper cables may be supported on telephone poles.

The cables terminate at the service area interfaces or at the terminals in structures that are built by the service providers. The structures may be huts, which have facilities for environmental conditioning such as power, fans, heating and air conditioning. The service providers may also build cabinets, which are lower cost structures that are typically used for cross-connections and electronic equipment.

Growth in some areas can be so fast that telephone service providers have difficulty in keeping up with demand for service. First of all, depending on the distance to the nearest terminal or end office, the process of burying the cable, or laying the conduits may be time-consuming. Moreover, the process of acquiring the land, whether by purchase or by lease, prior to installing the cable may result in further and more unpredictable delays.

It would be desirable for service providers to provide an infrastructure for telephone service quickly and efficiently.

Additionally, in areas where cable is best suited to provide service, it would be desirable to provide a temporary medium for telephone service that can be deployed in a more timely manner that is re-usable and easily removed when permanent cable installations are available.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

Figure 1:
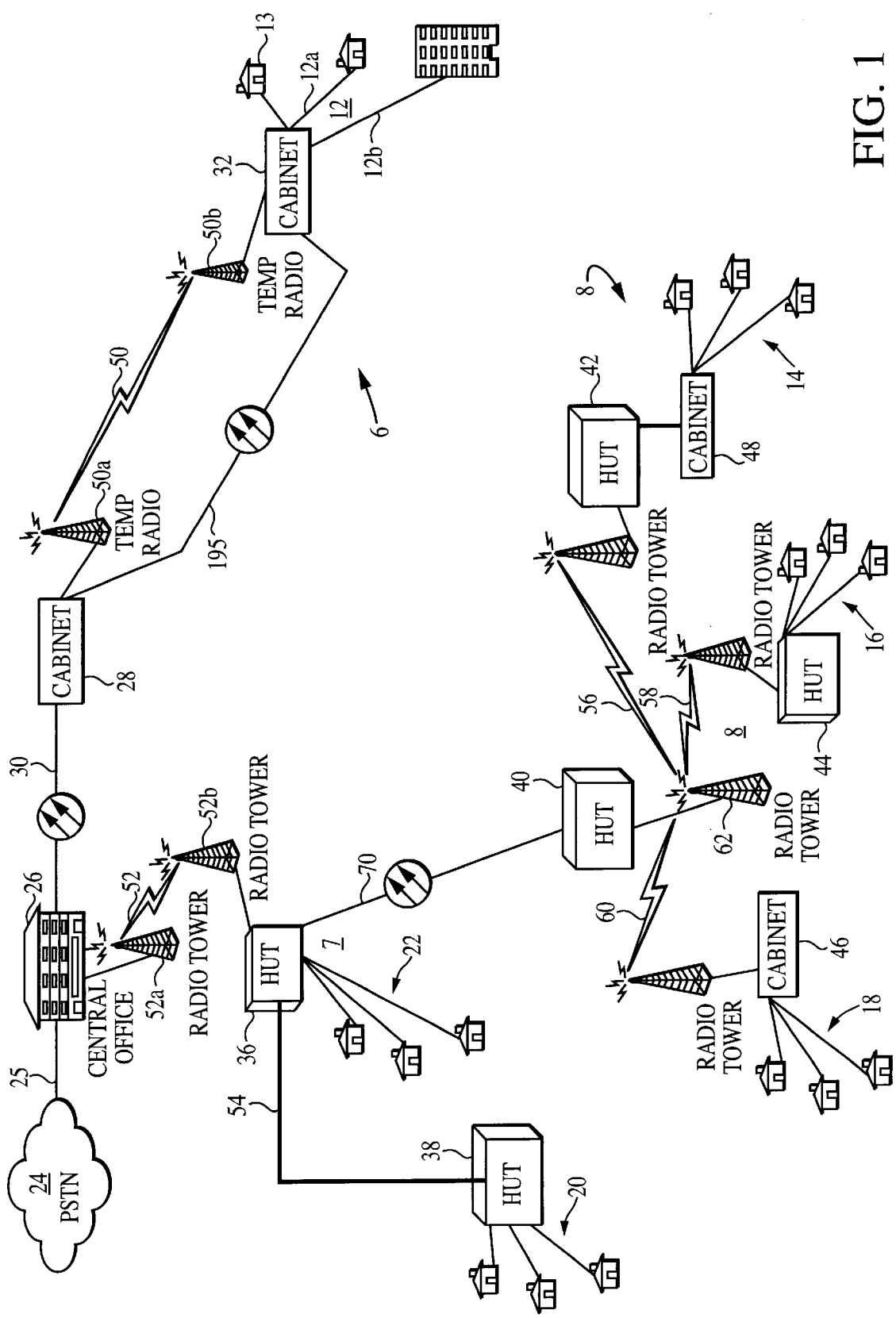
FIG. 1 is a block diagram of a telecommunications network illustrating the distribution of telecommunications service from the central office to local subscribers using wireless links.

FIG. 1 is a block diagram of a telecommunications network 5 of the type in which the present invention finds advantageous use. The network 5 in FIG. 1 includes a public switched telephone network (PSTN) 24 connected to a central office 26 by an interoffice telephone trunk 25. The central office 26 includes central office switches for routing telephone connections to and from telephone service subscribers in a central office service area 10. The central office 26 is connected to a first local distribution system 6, a local second distribution system 7, and a local third distribution system 8.

The first local distribution system 6 provides telephone service to users in a first service area 12. The second local distribution system 7 provides telephone service to users in a second service area 20 and a third service area 22. The second local distribution system 7 also connects the central office 26 to the third local distribution system 8. The third local distribution system 8 provides telephone connections to users in a fourth service area 14, a fifth service area 16 and a sixth service area 18.

The central office switches in the central office 26 typically includes information regarding telephone users that are connected in a major service area. The switches use the information to route calls between users in the PSTN 24 and users in the major service area 10. The switches may also monitor the usage of telephone services by the users and perform or facilitate auxiliary telecommunications services to which the user may subscribe (e.g. call waiting, voice mail, call forwarding, etc.).

The local distribution systems 6, 7, 8 include connecting equipment that provides connections from the subscribers in the service areas to the central office 26. The connecting equipment, which is described further below with reference to FIGS. 2–4, includes telephone line distribution equipment such as, multiplexing equipment and cross-connect panels, and telephone lines or cables, that provides connections between the users and the central office 26. The telephone lines, or cables, may include copper wire or optical links. In a preferred embodiment, the telephone lines also include radio links. The telephone line distribution equipment may be enclosed in huts or cabinets. The telecommunications devices used by the users may be connected directly to the connecting equipment in the huts or cabinets. Huts and cabinets may also be connected to each other to provide a fan out of service capacity that extends the central office service area 10.

Huts and cabinets are structures that are built to house telecommunications equipment. Huts are typically larger than cabinets, being large enough to include one or more shelves of equipment. Huts may include environmental conditioning equipment such as, fans, air conditioning, heating and a power connection. Cabinets may only be large enough to provide an enclosure for the equipment that is not sensitive to environment conditions, but could also house fans. Huts and cabinets are well known in the art and require no further description.

The first local distribution system 6 includes a cabinet 28 connected to the central office 26 via an optical fiber 30. The cabinet 28 is connected to a second cabinet 32 via a radio link 50. The radio link 50 is implemented using a first temporary radio tower 50a and a second temporary radio tower 50b. The radios may be placed in cabinets, on pallets, skids or wheeled carts, and may be re-used once a permanent link has been installed. The users access the telephone systems from customer premises equipment (CPE) on their premises. The CPE of the users in the service area 12 are connected to the cabinet 32 by user connections 12a. The user connections 12a typically include twisted pair wires although other types of connections maybe used such as coaxial cable, fiber-optic cable, etc. In a preferred embodiment, the connections from the user CPE the central office 26 form a digital loop carrier.

One advantage of the first local distribution system 6 is that it employs the temporary radio link 50 between the first temporary radio tower 50a and the second temporary radio tower 50b. The temporary radio link 50 may be employed when the users in the service area 12 require telecommunications service before a cable can be buried between the first cabinet 28 and the second cabinet 32. Another advantage is that the radio equipment is reusable. Once a permanent cable is deployed, the temporary radio link 50 may be removed and implemented elsewhere.

The second local distribution system 7 includes a first hut 36 that is connected to a second hut 38 via a DS1 line 54. The first hut 36 communicates with the central office 26 over the third radio link 52. The first hut 36 includes connections to users in the third service area 22 and a connection by an optical cable 70 to a third hut 40 in the third local distribution system 8. The third hut 40 is connected to a fourth hut 42 via a radio link 56. The fourth hut 42 is connected to a third cabinet 48 for connecting to the users in the fourth service area 14. The third hut 40 is also connected to a fifth hut 44 via a radio link 58 and to a fourth cabinet 46 via a radio link 60. The radio links 56, 58, 60 from the hut 40 are made using respective antennas on the radio tower 62.

The capacity or, maximum number of users connected in the local distribution systems local distribution systems 6, 7, 8 may be determined by the capacity of the connecting medium (e.g. DS1, DS3, etc.), the capacity of the equipment used in the huts or the cabinets and by desired performance characteristics.

The capacity of the connecting media may be maximized by the use of optical fiber. The optical links 30, 70 used in a telecommunications network 5 may include a Synchronous Optical Network (SONET) fiber-optic cable at OC-1, OC-3 or OC-9 levels having line rates of 52 Mb/s, 155 Mb/s, and 466 Mb/s, respectively. The connecting equipment in the huts and cabinets may be configured to divide links into lower capacity links. For example, the optical link 70 connecting the first hut 36 with the third hut 40 may be a n-OC-3 links, where n is determined according to the required capacity. The first hut 36 may provide other lower capacity links in addition to, for example, a DS1 link 54.

The radio links 50, 52, 56, 58, 60 are preferably microwave radio links, although any suitable wireless connection may be used. The microwave radio signal is preferably radio signal that is licensed by the Federal Communications Commission (FCC). An unlicensed signal may also be used, if speed of deployment is important in a particular installation, preferably with a spread spectrum modulation technique The service areas 12, 14, 16, 18, 20 and 22 comprise the central office service area 10. The service areas may be areas that are still growing. Each time a new user is added, it must be connected to the central office 26 via its local distribution system. As users are added to a service area, the capacity of the local distribution system may be reached such that new users may no longer be added.

Telecommunications service providers may either increase the capacity of the local distribution system, or build a new local distribution system. New local distribution systems are typically built in the major service areas 10 expands to include a new service area. One advantage of the present invention is that new local distributions systems may be deployed in a relatively short amount of time. The telecommunications service provider can build a new local distribution system by building huts or cabinets and by erecting radio towers, and then connecting the users to the huts or cabinets. It would not be necessary to bury cable other than the cables connected the users in the service area.

Figure 2:
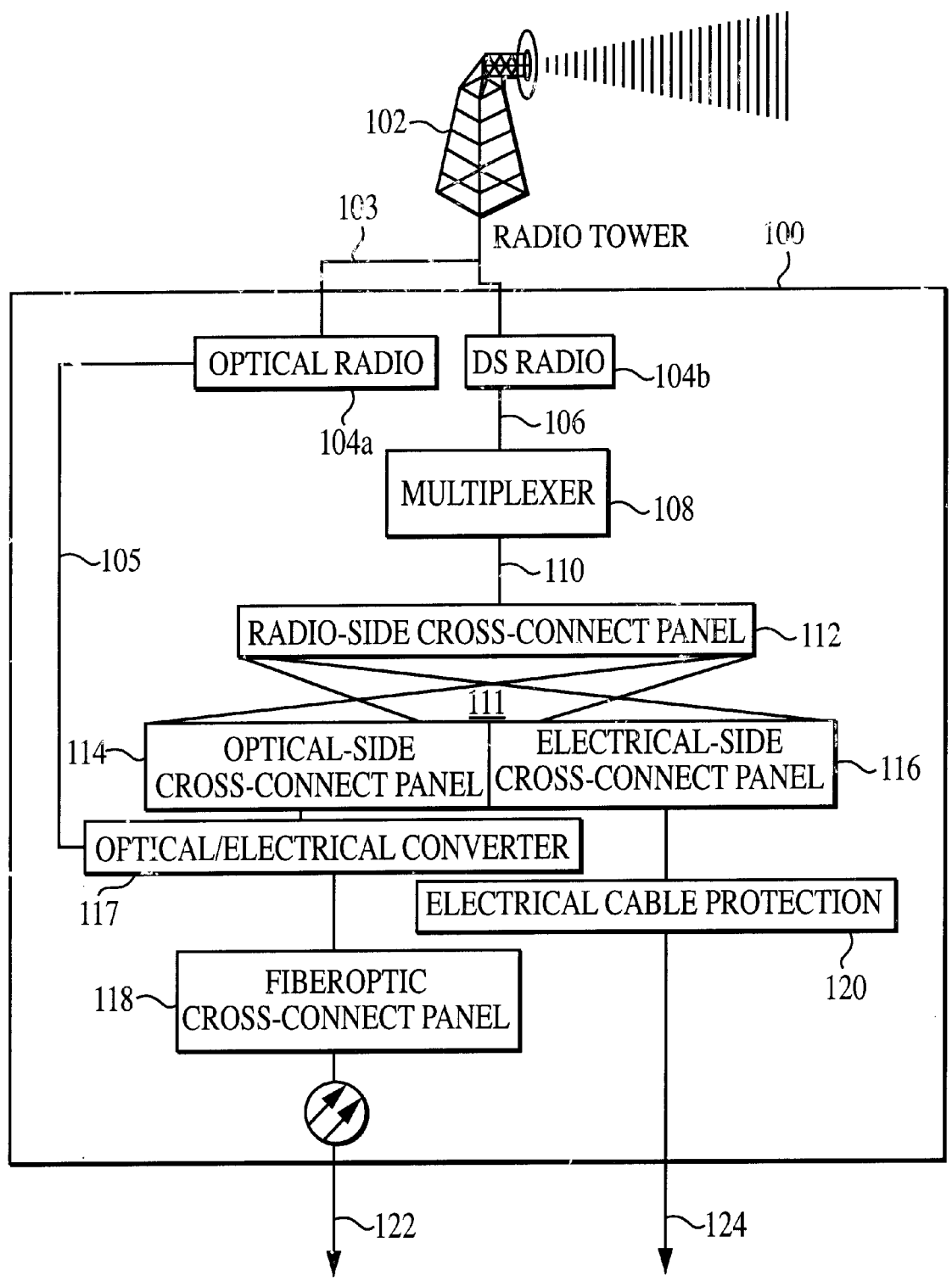
FIG. 2 is a block diagram of local distribution system according to a preferred embodiment.

FIG. 2 is a block diagram for a telecommunications distribution enclosure 100 of the type that may be used in the telecommunications network 5 in FIG. 1. Any suitable structure containing connecting equipment may be used as the enclosure 100. Suitable structures may include huts and cabinets.

The enclosure 100 in FIG. 2 shows the functions and types of equipment that may be used in the local distribution systems in FIG. 1. In a preferred embodiment, the connecting equipment implements digital loop carrier connections in segments between the central office 26 and the telecommunications devices, or CPE's on the customer premises. One of ordinary skill in the art will appreciate, however, wireless digital loop carrier can interface with other types of transmission systems such as high bit-rate digital subscriber lines (HDSL), T-carrier or fiber-optic systems. Local distribution systems may also mix the types of connections in one enclosure.

The enclosure 100 includes connecting equipment for communicating by radio at a radio link 103 at the radio tower 102, by fiber-optic cable at a fiber-optic outside plant 122 and by electrical signals at a copper cable outside plant 124. The connecting equipment in enclosure 100 is connected to the central office (i.e., office-side connection) and one or more connections to either other enclosures or subscribers (i.e., subscribers-side connection). The office-side connection and the subscriber-side connections may be of any type, however, a higher capacity medium such as fiber-optic cable or radio is preferable. A primary function of the connecting equipment is to distribute higher capacity office-side connections to lower, or the same, capacity subscriber-side connections. In the description that follows, the radio link 103 is the office-side connection; and the fiber outside plant 122 and copper outside plant 124 are subscriber-side connections. One of ordinary skill in the art will appreciate, however, that the radio tower 102 may be connected on the subscriber-side and one of the other outside plants 122, 124 may be connected to the office-side of the enclosure 100.

The connecting equipment in enclosure 100 may be configured in a variety of different ways according to the type of equipment connected to it, as well as plans for increasing capacity on the subscribers side. For example, the cross-connect panels may branch out on the subscribers side and connect to other cross-connection systems that connect on a subscribers side to other distribution systems or directly to subscribers. Alternatively, the radio side cross-connect 112 may connect only to the electrical side cross-connect panel 116 for connecting DS0 lines directly to the subscribers at the outside plant 124.

A radio tower 102 may be connected to one of several types of radios via a radio link 103 which may be a wave guide or a cable. An optical radio 104a may be used to connect to an optical/electrical converter 117 which connects to a fiber-optic cross-connect 118 by a fiber-optic cable 105. The optical radio 104 may communicate at SONET OC-1, OC-3, OC-9, or OC-12 levels. The signals are converted from electrical signals to optical signals at the optical/electrical converter 117 to provide the proper optical connections at the fiber-optic cross-connect 118. The signals may be communicated to the fiber-optic cross-connect panel 118 for distribution over the fiber-optic cable outside plant 122. The fiber-optic cross-connect panel 118 in a preferred embodiment is an LGX distribution frame from Lucent Technologies.

A digital signal radio 104b may also be used to communicate DS3 or DS1 signal levels to a digital (DS) signal line 106. The digital signal line 106 may be connected to a multiplexer 108 for distribution to a multiplexed line 110. The multiplexer 108 receives digital signals from the DS radio 104b. The digital signals are preferably organized as channels of digital communication. The channels may be defined according to a domain that uses a characteristic of the signal for channel allocation. For example, channels may be defined in a time domain such that a fixed number of time slots in a signal may comprise a channel block. Each time slot may be allocated as a separate channel to enable the DS signal to carry independent telephone connections as data that are transported in time slots of channel blocks. One of the time slots may be designated as a control channel to control channel allocation and signaling functions. In another example, frequency slots are allocated as channels.

The multiplexer 108 directs each channel to multiplexed line 110 that corresponds to a user or a group of users that is a party to the telephone connection. The multiplexed line 110 may include a cable or bus comprising multiple signal lines connected to a cross-connect system 111. The cross-connect system 111 directs signals between the multiplexed line 110 on the office-side and selected subscribers connected to the subscriber-side outside plants at 122 and 124.

In a preferred embodiment, the multiplexer 108 connects a DSm signal to a lower level set of DSn signals. The preferred multiplexer 108 may be designated as a m/n multiplexer. For example, a 3/1 multiplexer connects a DS3 signal to a DS1 signal.

The cross-connect system 111 in the enclosure 100 includes a radio side cross-connect panel 112, an optical side cross-connect panel 114, and an electrical side cross-connect panel 116. The radio side cross-connect panel 112 provides termination for the digital signal multiplexed line 110 from the radio on the office-side of the enclosure 100. The optical side cross-connect panel 114 provides a termination for connections that will be made on the subscribers-side of the enclosure 100. The optical cross-connect panel 114 is connected to the optical/electrical converter 117 which is then connected to the fiber-optic cross-connect panel 118 to provide optical to electrical signal conversion and multiplexing or signal distribution functions that may be appropriate for the connection to the fiber-optic outside plant 122.

The cross-connect system 111 may use punch down blocks with wires connecting the radio-side multiplexed lines to the opposite panels 114, 116. The cross-connect system 111 may also be computer-based and provide for connection to an I/O terminal for configuration using a computer-based system. Examples of cross-connect systems that may be used in a preferred embodiment include DSX-1, DSX-3, FLM (Fiber Loop Mux), Lightspan, Sonoplex, QCP, DDP, etc.

The electrical cross-connect panel 116 provides termination points for connections to copper cable lines on the subscribers-side of the enclosure 100. The lines connected to the electrical cross-connect panel 116 may be lines that are to be connected to other distribution systems, lines that are to be connected directly to subscribers, or both. The lines are typically protected by an electrical cable protection device 120 to protect the connecting equipment in enclosure 100 from potentially destructive inductive spikes or lightening. Suitable protection devices may include gas beam protection devices, carbon block devices, and solid state devices.

Figure 3:
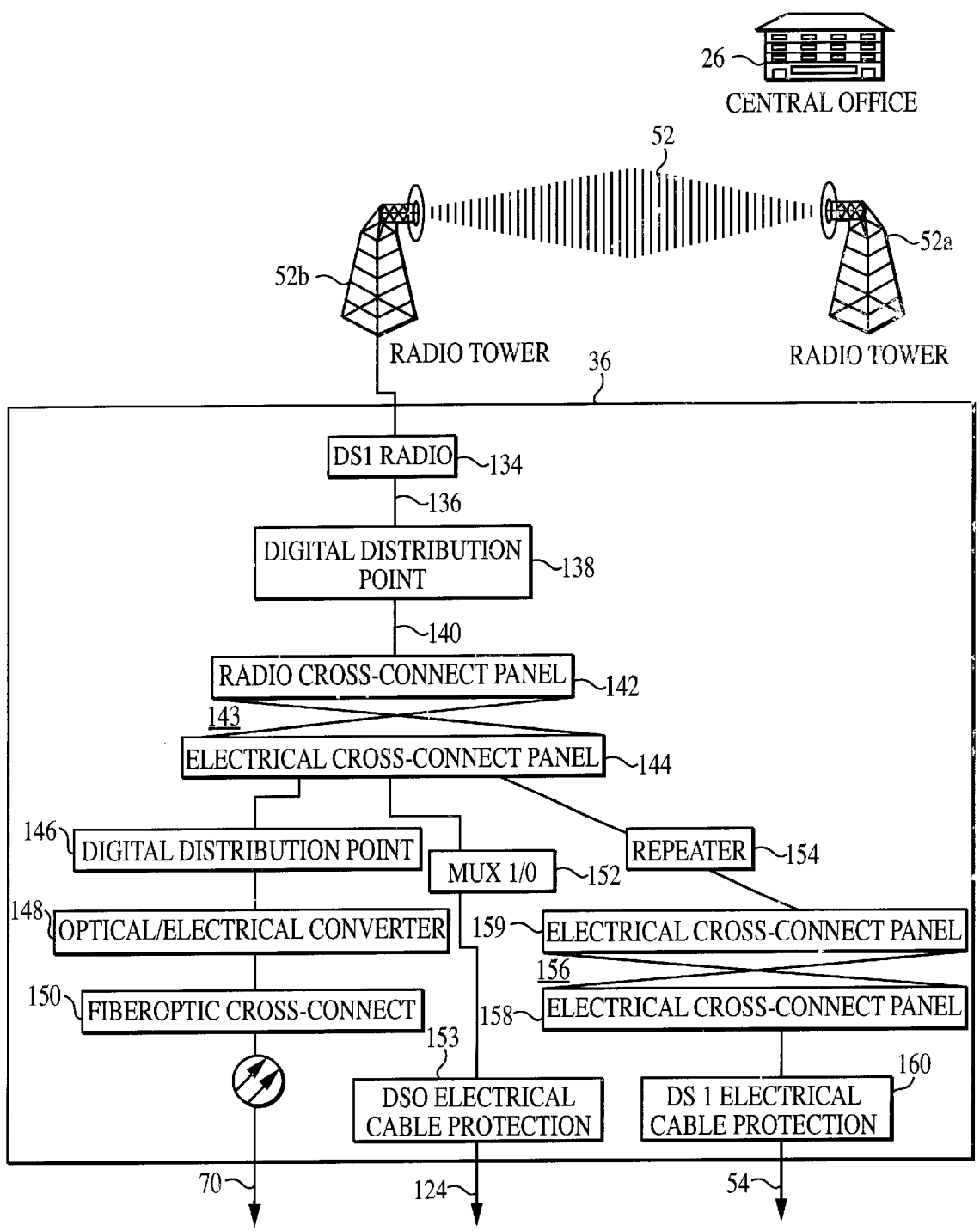
FIG. 3 is a block diagram of a first example of a local distribution system in the telecommunications network in FIG. 1.

One of ordinary skill in the art will appreciate that the connecting equipment in FIG. 2 may include more equipment and devices in accordance with specific design criteria and varying capacity requirements. FIG. 3 shows an example of a configuration of the connecting equipment of the enclosure 36 in FIG. 1 in which the office-side connection includes the office side radio tower 52a connected to the central office 26 for transmitting either a DS1 or a DS3 signal over the radio link 52. It is to be understood by one of ordinary skill in the art that the enclosure 36 may also include connecting equipment for only a DS3 connection or for only a DS1 connection.

The enclosure 36 includes a DS1 radio 134, which receives DS1 level signals from the radio tower 52b. The DS1 radio 134 is connected to a digital distribution point 138 via a DS1 line 52b. The digital distribution point 138 is a terminal location used to electrically connect or multiplex digital signal facilities. The digital distribution point 138 may include cable terminations to establish electrical connections between any two terminated DS1 network elements. For example, in FIG. 3, the digital distribution point 138 provides electrical connections between the DS1 radio 134 and a radio side cross-connect 142. In a preferred embodiment, the digital distribution point panel 138 includes the DDP-1 84-circuit panel from the ADC Corporation.

The digital distribution point panel 138 is connected to a radio/electrical cross-connect panel 143 via DS1 lines 140.

The radio/electrical cross-connect panel 143 includes a radio side cross connect panel 142 and an electrical cross connect panel 144. The radio side cross-connect 142 is cross-connected to the electrical-side cross-connect 144 using well-known cross-connect systems such as a DSX cross-connect panel, a quick-connect punch-down (QCP) panel or a Litespan™ system from DSC. The electrical-side cross-connect panel 144 may be connected to various types of equipment. For example, a second digital distribution point 146 may connect the DS1 level lines to an optical/electrical converter 148. The optical/electrical converter 148 converts the DS1 signals to a signal in SONET format for transmission on a fiber-optic cable. The fiber-optic cable may be connected to a fiber-optic cross-connect panel 150 for distribution to other distribution systems connected via the fiber-optic outside plan 70.

The electrical side cross-connect panel 144 may also be connected to the multiplexer 1/0 152 for multiplexing a DS1 level line to several DS0 level lines. The DS0 level lines are connected to a DS0 electrical cable protection 153, which is connected to the DS0 lines on the copper cable outside plant 124. The multiplexer 1/0 152 in a preferred embodiment is the Litespan™ 2000 system from DSC. The Litespan™ 2000 system is preferred because it can hand off DS1 lines and DSQ lines and provide multiplexing cross-connect functions and signal conversion for fiber-optic cable.

The electrical cross-connect panel 144 may also be connected to a repeater 154. The repeater 154 includes signal amplifiers for boosting a signal that may be part of a connection traversing a long distance. The repeater 154 may be connected to a second cross-connect system 156 that includes a first cross-connect panel 157 and a second cross-connect panel 158. The second cross-connect panel 158 is connected to DS1 lines that comprise the copper outside plant 54 from the subscribers side of the enclosure 100 which is protected by a DS1 electrical cable protection 160.

Figure 4:
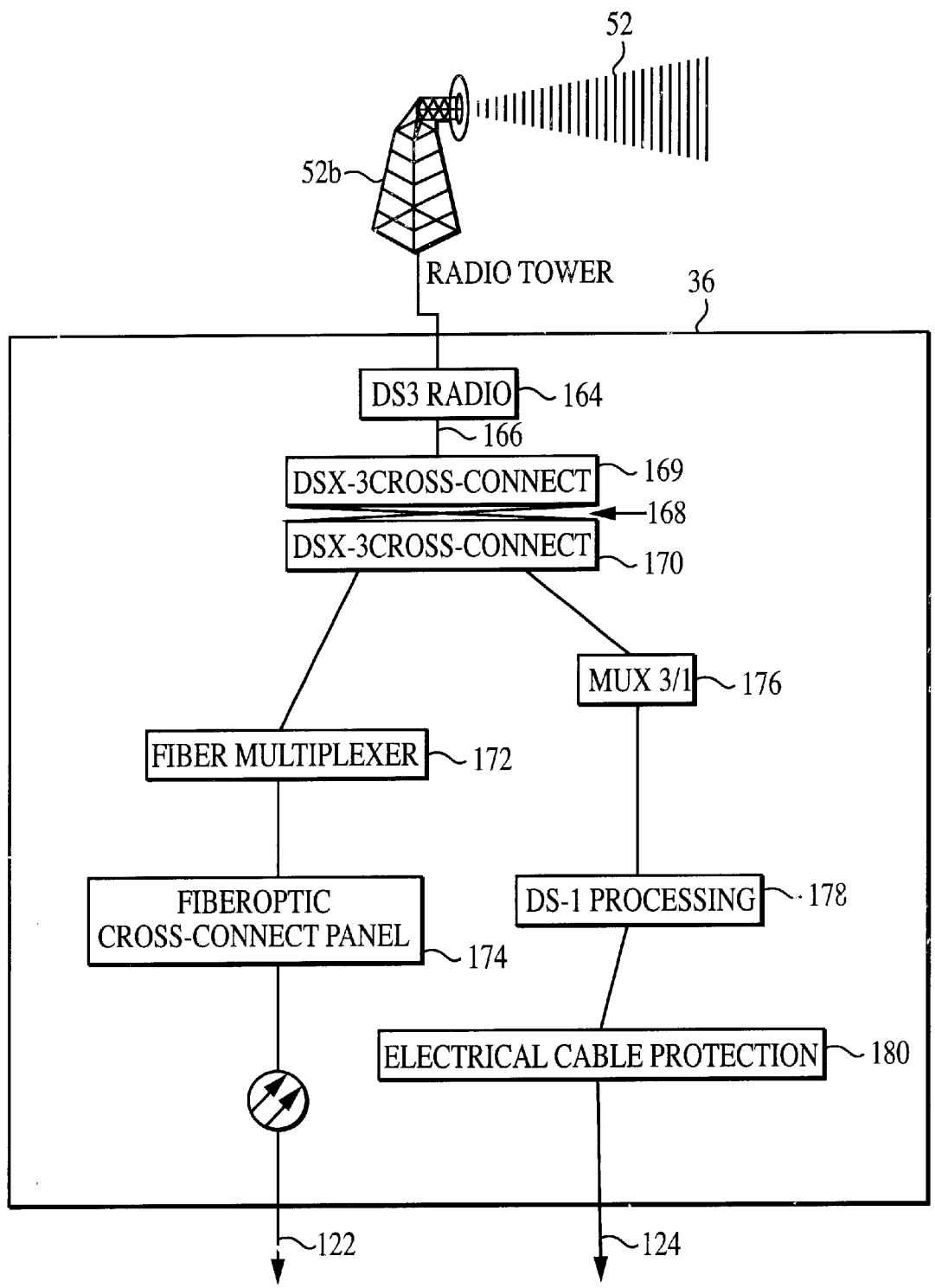
FIG. 4 is a block diagram of a second example of a local distribution system in the telecommunications network in FIG. 1.

FIG. 4 shows enclosure 36 having an office-side connection to a DS3 radio link 52. The connecting equipment for distributing signals received at a DS3 level in enclosure 36 includes a DS3 radio 164 which receives DS3 level signals from the radio tower 52b. The DS3 radio 164 is connected to a DSX-3 cross-connect system 168 via DS3 lines 166. The DSX-3 cross-connect system includes a first DSX-3 panel 169 and a second DSX-3 cross-connect panel 170. The DSX-3 cross-connect system 168 may be implemented in a preferred embodiment using a DSX cross-connect system from the ADC Corporation.

The DSX cross-connect system 168 may be connected to a fiber multiplexer 172. The fiber multiplexer 172 provides signal conversion and multiplexing functions for connecting an electrical DS3 line to a fiber-optic line. The fiber multiplexer 172 may then be connected to a fiber-optic cross-connect panel 174 for distributing fiber-optic signals over the fiber-optic plant 70. In a preferred embodiment, the fiber multiplexer 172 and the fiber-optic cross-connect panel 174 may be implemented using an FLM 150 from Fujitsu and an LGX distribution frame from Lucent Technologies.

The DSX cross-connect panel 168 may also be connected to a multiplexer 3/1 176. The multiplexer 3/1 176 distributes the DS3 level signals as DS1 level signals. The DS1 signals may then be processed at a DS1 processing connecting equipment, which may include any of the DS1 processing equipment in FIG. 3 starting from the digital distribution point 138 as discussed above. It is to be understood by one of ordinary skill in the art that the multiplexer 3/1 176 and any other element that performs multiplexing functions described herein also performs de-multiplexing functions for signals that travel from the office-side to the subscriber-side and multiplexing functions for signals that travel from the subscriber-side to the office-side.

Figure 5:
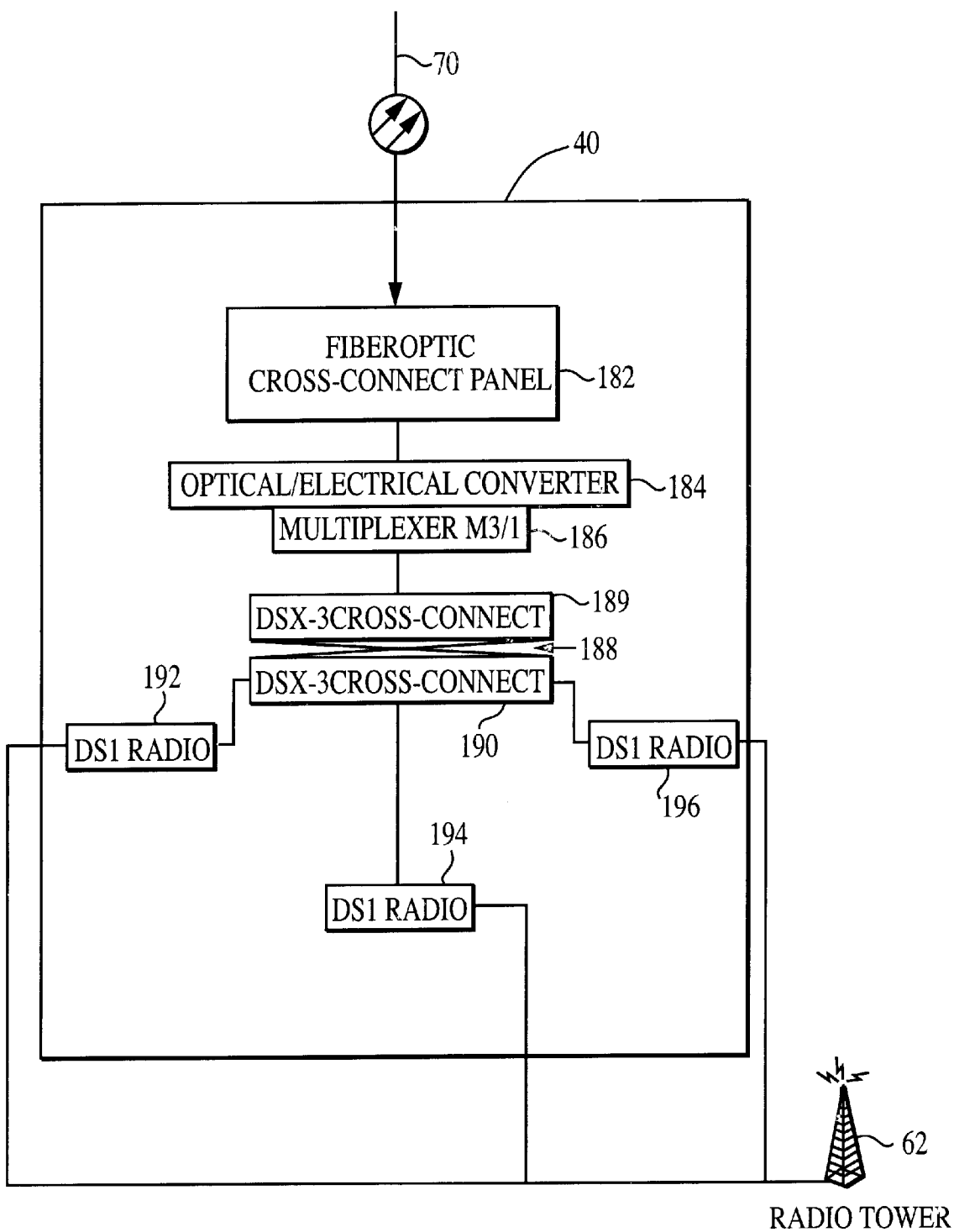
FIG. 5 is a block diagram of a third example of a local distribution system in the telecommunications network in FIG. 1.

FIG. 5 shows a block diagram of the third hut 40 in FIG. 1, which is connected on the office-side to the first hut 36 via the optical link 70. The third hut 40 includes distribution equipment for distributing telecommunications service over radio links 56, 58, 60. The third hut 40 includes a fiber optic cross-connect panel 182, an optical/electrical converter 184, a m/n multiplexer 186, a DSX cross-connect 188 and DSn radios 192, 194, 196. The optical link 70 that connects the third hut 40 in FIG. 4 to the central office is an OC-1 optical link. The connecting equipment in the hut 40 multiplexes the DS3 to DS1 links carried by the DS1 radios 192, 194, 196. One of ordinary skill in the art will understand that other signal levels may be processed by the connecting equipment in the hut 40.

The fiber optic cross connect panel 182 is connected to the office side optical link 70 and provides a cross-connect function for the fiber optic link 70. In a preferred embodiment, the fiber optic cross connect panel 182 includes the LGX distribution system from Lucent Technologies.

The fiber optic cross connect panel 182 connects to the optical/electrical converter 184 which converts the optical OC-1 signal to an electrical signal. The DS3 signal is multiplexed to DS1 signals by the 3/1 multiplexer 186. The DS1 lines are connected to the DSX cross connect panel 188 for distribution to the DS1 radios 192, 194, 196 that connect to the subscribers.

Figure 6:
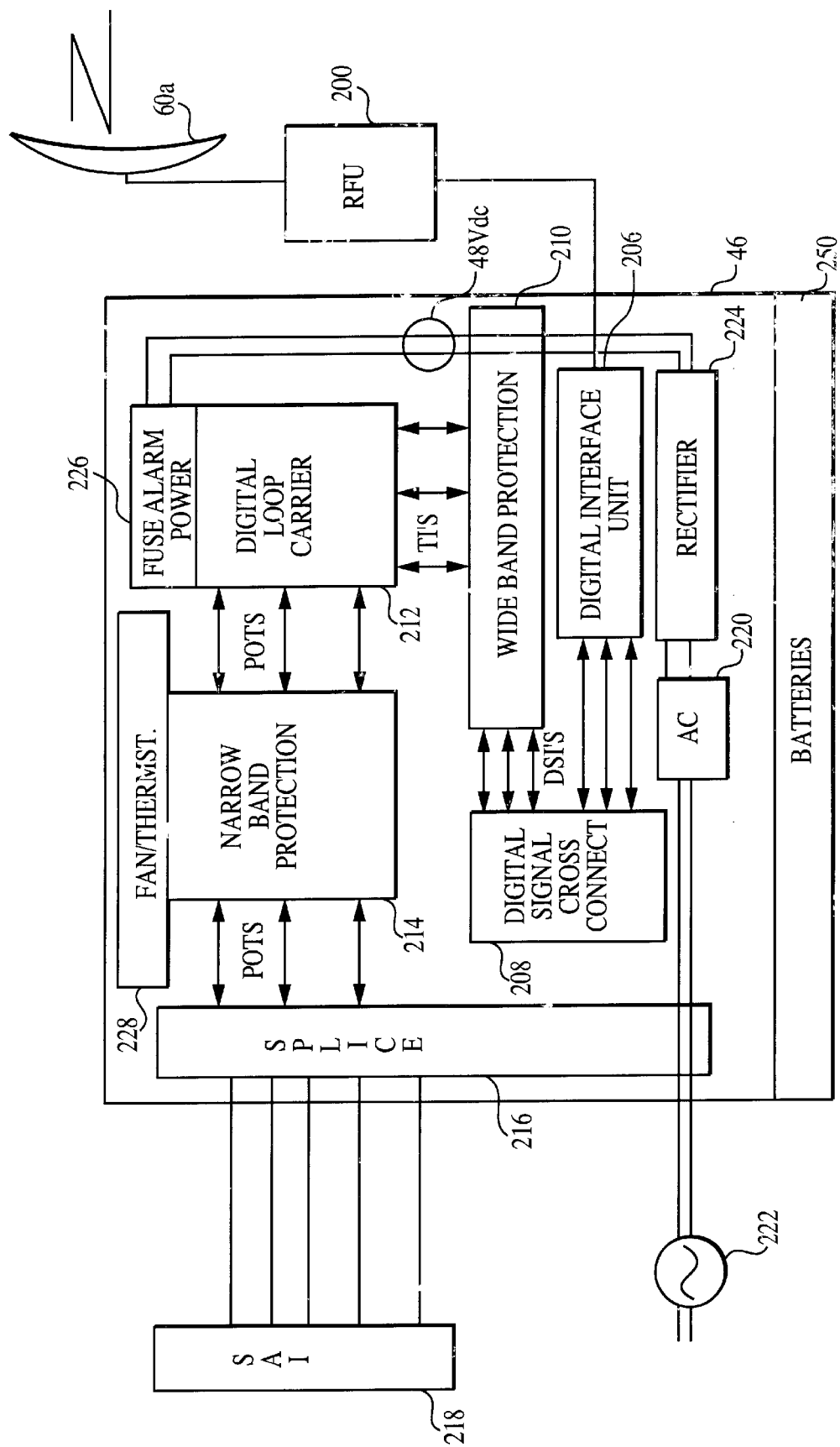
FIG. 6 is a block diagram of a fourth example of a local distribution system in the telecommunications network in FIG. 1.

FIG. 6 shows the cabinet 46 in the local distribution system 8. The cabinet 46 includes a digital interface unit 206 connected to a radio interface unit 200. The radio interface unit 200 communicates DS1 level signals over the radio antenna 62. The digital interface unit 206 connects DS1 lines to a digital signal cross connect 208. The digital signal cross connect 208 connects to a wide band protection unit 210, which provides electrical protection for the higher frequency DS1 lines. The wide band protection unit 210 connects the DS1 lines to a digital loop carrier 212. The wide band protection unit 210 may include gas beam protection devices, carbon block devices, and solid state devices. The digital loop carrier 212 is known in the art and, in a preferred embodiment, may be implemented using a Litespan system from the DSC Corporation. The digital loop carrier unit 212 is connected by plain old telephone system (POTS) lines, or DS0 lines to a narrow band protection unit 214 which provides electrical protection to the lower frequency DS0 lines. The narrow band protection unit 214 may include gas beam protection devices, carbon block devices, and solid state devices. The DS0 lines are connected to the subscriber area interface 218 via a splice cabinet 216.

The cabinet 46 includes an AC power input 220 connected to an AC line 222. The AC power input 220 is connected to a rectifier 224 which converts the AC to DC power used by the electronic equipment in the cabinet 46. The rectifier 224 includes a 48 VDC output to a fuse alarm power unit 226 on the digital loop carrier unit 212. The fuse alarm power unit 226 is connected to a fan/thermostat 228 used for maintaining the temperature in the cabinet 46 sufficiently cool to permit the electronic equipment to run. The cabinet 46 may include a battery backup 250 to maintain service when the power fails.

The cabinet 46 in FIG. 6 may be advantageously used to set up a temporary telecommunications link such as the temporary radio link 50a in FIG. 1 while permanent optical or copper plants are being deployed. The cabinet 46 may be used for a temporary radio link by using a removable radio frequency unit 200. In one example, the radio frequency unit 200 may be provided on a pallet, skid or pole with the antenna 60a while the radio link is operational. The digital interface unit 206, the radio frequency unit 200 and antenna 60a may then be removed and replaced with a fiber optic cross connect or a digital distribution point when a fiber optic or copper plant is available. In another example, the radio frequency unit 200 and the digital interface unit 206 may be provided as one component on a shelf in the cabinet 46. The radio may then be removed from the shelf when the fiber or copper plants are available and replaced with the appropriate components.

Using a cabinet such as the cabinet 28 in FIG. 1, or using a hut such as the hut 40 in FIG. 1, a method for installing telecommunications service may be implemented for either temporary use of the radio while copper or fiber plants are being deployed. The temporary radio link 50 permits the telephone service provider to respond quickly to requests for service. For example, a user in the service area 12 may be the first user in the new service area 12 to require service. The service provider may perform a temporary installation such as the one shown in Table 1.

TABLE 1

| | |
|---|---|
| Install the cabinet having: | A next generation digital loop carrier system |
| | A first digital signal cross-connect (DSX) panel |
| | A second DSX panel |
| | A protection device |
| Connect a cable between the user location in the service area and the second DSX panel | |
| Connect a first temporary radio to the second hut | |
| Connect a second temporary radio having a third DSX panel and a protection device to the cabinet with cable | |
| Configure the first DSX panel, the second DSX panel, the third DSX panel and the radio link to provide a connection between the user location and the central office. | |

The method of Table 1 may be augmented during the expansion of the number of users in the new service area by configuring new users at the DSX panels and at the radio link. At a future time, a hard link 195 (shown in FIG. 1 connecting the cabinet 28 to the cabinet 32), which may be an optical connection, may be installed to replace the radio link. The first and second temporary radios may be removed and re-used for another temporary link.

Figure 7:
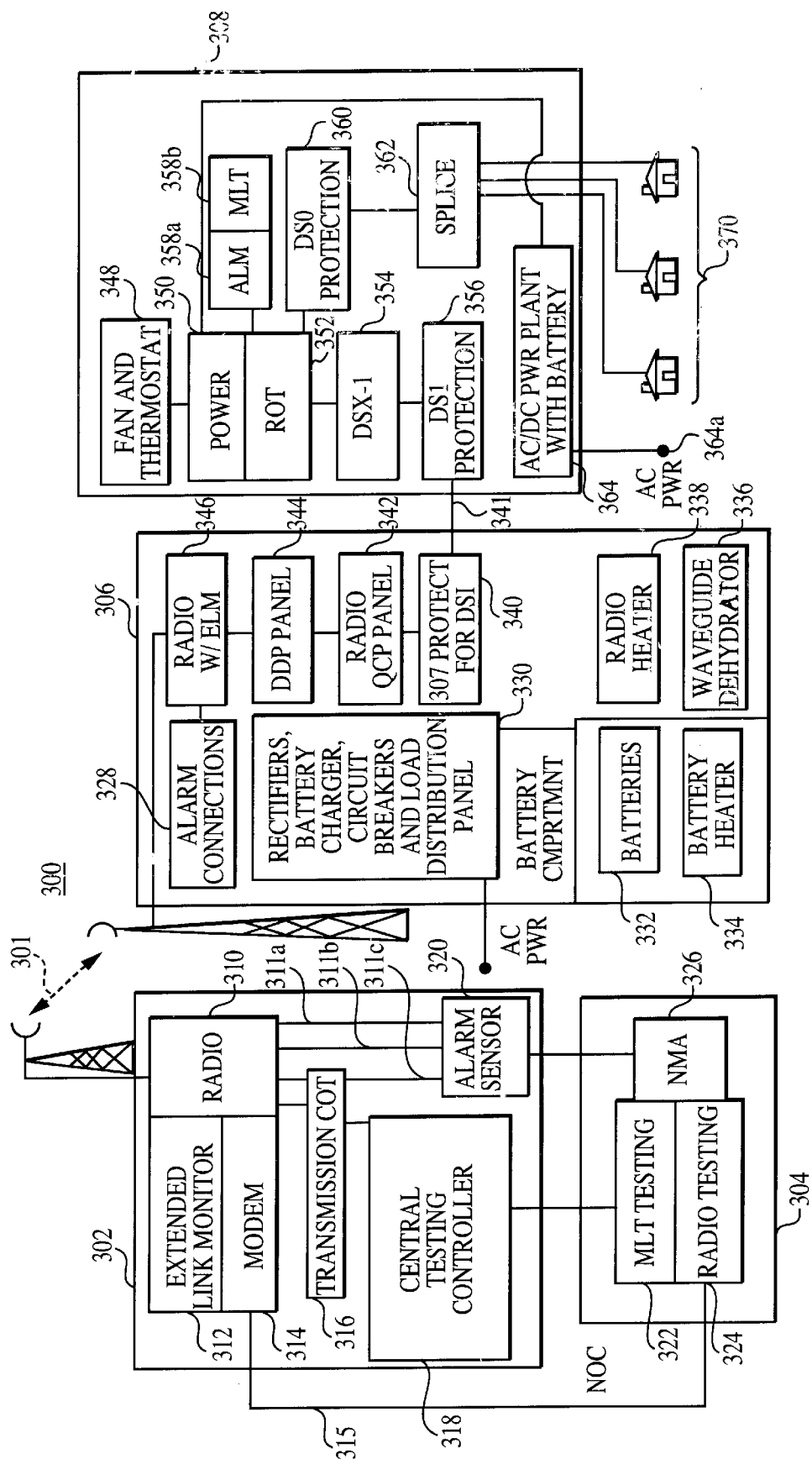
FIG. 7 is a block diagram of an alternative embodiment of the telecommunications network system FIG. 1.

FIG. 7 shows an alternative embodiment for a telecommunications network 300 wherein a central office 302 and a network operations center 304 are communicatively connected to a radio cabinet 306 with a cable distribution cabinet 308. The radio cabinet 306 is used to house radio equipment for a radio link 301 with the central office 302 and the cable distribution cabinet 308 is used to house cable distribution equipment for connecting to a plurality of subscribers 370. In addition to the distribution equipment in the central office 302, the radio cabinet 306 and the cable distribution cabinet 308, the telecommunications network 300 in FIG. 7 includes a diagnostic system (described below) for communicating alarms to the network operations center 304 in an efficient manner and for providing system testing and alarm diagnostics. The radio cabinet 306 and the cable distribution cabinet 308 may be co-located, or they may be sufficiently remote from each other to require repeaters.

The central office 302 includes a radio 310, which is connected to switching equipment (not shown) for communicating with the PSTN (see FIG. 1). The radio 310 uses the radio link 301 to communicate with the radio cabinet 306 which includes signal distribution equipment such as a subscriber side radio 346, a digital distribution point 344, a radio quick cross-connect panel 342 and a DS1 protection device 340. The digital distribution point 344, the radio quick cross-connect panel 342 and the DS1 protection device 340 operate similar to corresponding components described above. The radio quick cross-connect panel 342 and the digital distribution point 344 are optional and are provided for the flexibility of extending to other cable distribution cabinets. The radio cabinet 306 includes an AC/DC conversion and load distribution panel 330, a radio heater 338, a battery set 332, a waveguide dehydrator 336 and a battery heater 334 as environmental resources for the radio equipment in the radio cabinet 306. The AC/DC conversion and load distribution panel 330 converts the AC power to the cabinet into a DC voltage source, provides battery charging functions and load distribution within the radio cabinet 306. The batteries 332 are used for a DC power backup. The battery heater 334, radio heater 338 and the waveguide dehydrator 336 provide environmental control for the designated elements and equipment as is known to one of ordinary skill in the art.

The cable distribution cabinet 308 includes a DS1 protection device 356, a DSX-1 cross-connect panel 354, a transmission remote terminal 352, a DS0 protection device 360 and a splice cabinet 362. The DS1 protection device 356 protects the cable distribution equipment in the cabinet 308 from inductive spikes and other destructive noise that may be generated on a DS1 cable 341 between the radio cabinet 306 and the cable distribution cabinet 308. The DSX-1 cross-connect panel 354 and the transmission remote terminal 352 distribute the DS1 signal to the DS0 lines to the subscribers as described above with reference to FIG. 3. The DS0 protection device 360 protects the distribution equipment from inductive spikes and other destructive noise coming from the DS0 lines 371 that extend to the subscribers 370. In a preferred embodiment, the transmission remote terminal 352 includes a DSC Corporation Litespan system that distributes DS1 signals to DS0 lines.

The diagnostic system in the telecommunications network 300 in FIG. 7 includes equipment in a central control location for receiving the status of alarms that have been sensed and transmitted from remote locations. The central control location in the network 300 in FIG. 7 includes the network operations center 304, which sends diagnostic instructions and receives responses via the central office diagnostic equipment. The central office diagnostic equipment (described further below) communicates with diagnostic equipment in the radio cabinet 306 and in the cable distribution cabinet 308, and any other similarly equipped huts or cabinets in the serving area of the central office. The diagnostic equipment in the radio cabinet 306 and in the cable distribution cabinet 308 includes alarm sensors and communications modules. The alarm sensors sense alarm conditions and communicate the conditions to the communications modules. The communications modules process the alarm conditions and report the conditions by communicating the conditions to the central office diagnostic equipment. The central office diagnostic equipment then communicates alarm and status conditions for the equipment in the service area of the central office to the network operations center 304.

The network operations center 304 includes a metallic loop test controller 322, a radio test controller 324, and a network monitor and analyzer 326. The metallic loop test controller 322 initiates and monitors metallic loop testing of the connections to the subscribers 370 connected to the central office 302. The metallic loop testing process is well known to those of ordinary skill in the art and require no further description. The radio testing controller 324 controls the communication of the diagnostic commands to the central office 302 and the status information from the cabinet 306.

The central office 302 diagnostic equipment includes an extended link monitor (ELM) 312, a modem 314, a transmission central office terminal 316, a central testing controller 318, and alarm sensors 320. The modem 314 is connected to the radio testing controller 324 in the network operations controller 304 by a communications line 315. The radio testing controller 324 sends diagnostic commands and receives diagnostic information to and from the modem 314 via the communications line 315. The modem sends the diagnostic commands to the extended link monitor 312 for processing and any commands that should be sent to the radio cabinet 306 are communicated over the radio link 301.

The central testing controller 318 is connected to the metallic loop testing controller 322 in the network operations center 304. The central testing controller 318 controls metallic loop testing operations with the subscriber lines in the service area of the central office 302 by interrogating metallic loop test unit 358*b* (described below). The central testing controller 318 may initiate metallic loop testing by sending commands through the transmission central office terminal 316. The transmission central office terminal 316 also extracts alarm information from the communications lines in the central office 302.

The alarm sensors 320 include sensors to communicate network problems such as equipment failures and environmental alarms. The alarm sensor 320 includes a radio input 311*a*, a radio cabinet input 311*b*, and a cable cabinet input 311*c*. The radio input 311*a* communicates alarm information that is generated upon an alarm condition sensed in the radio 310. The radio cabinet input 311*b* communicates alarm information received from the alarm sensing equipment in the radio cabinet 306 (described further below). The cable cabinet input 311*c* communicates alarm information received from alarm sensing equipment in the cable distribution cabinet 308 (described below). The alarm sensors 320 are connected to the network monitor and analyzer 326 in the network operations center 304. An operator at the network monitor and analyzer 326 may initiate requests for alarm information and receive reports or logs on display screens or printouts. The operator may also initiate metallic loop testing at the network monitor and analyzer 326 and receive reports.

The radio cabinet 306 includes a radio with ELM 346, which is connected to alarm connections 328 for communicating alarm conditions sensed in the area of the radio cabinet. ELM 346 receives diagnostic commands from the central office extended link monitor 312. The alarm connections 328 are alarm sensing equipment in the radio cabinet 306 which may include sensors that detect open or short conditions, environmental conditions, equipment failures, signal degradation, etc. The radio with ELM 346 connects to the signal distribution equipment as discussed above. The signal distribution equipment is used to communicate diagnostic information with the cable distribution cabinet 308. The cable distribution cabinet 308 includes an alarm sensor 358*a* and a metallic loop testing unit 358*b*. The alarm sensor 358*a* senses alarm condition such as open or short conditions, environmental conditions, equipment failures, signal degradation, etc. The metallic loop testing unit 358*b* manages the metallic loop testing process at the subscriber side. The alarm sensor 358*a* and the metallic loop-testing unit 358*b* communicate diagnostic information via the transmission remote terminal 352.

In a preferred embodiment, the alarm sensors 358*a* and the metallic loop testing unit 358*b* communicate with the radio with ELM 346 in the radio cabinet 306 by carrying the diagnostic information on a channel on the DS1 signal. The channel may be a data (e.g. RS232 channel), a voice channel (e.g. DS0 channel), or it may be a control channel. The channel communicates the information over the radio link 301 with the central office 302.

The advantage of using the diagnostic equipment in the network 300 in FIG. 7 is that alarms may be sensed remotely in the service area served by the central office 302 and communicated to the central office 302 which ultimately communicates the diagnostic information to the network operations center 304. The alarm sensor 358*a*, the metallic loop testing unit 358*b*, and the alarm connections 328 in the radio cabinet 306 may each communicate as a subscriber on a channel of the DS1 signal. The channel may be known to the extended link monitor 312 and to the central testing controller 318 to provide the diagnostic information to the network operations center 304 from the extended link monitor system and from the metallic loop testing system. In a preferred embodiment, the extended link monitor equipment, which includes the extended link monitor 312 and the radio with ELM 346 may include the Alcatel MDR 6000 Series radio. In a preferred embodiment, the metallic loop testing equipment may include the Wiltron Loopmate or CO Tollgrade.

One advantage of the diagnostic system shown in FIG. 7 is that problems with the telecommunications system are monitored on an ongoing basis with little user intervention. Reporting and test procedures may be set up to occur automatically or at scheduled times.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:

1. A system for providing telecommunications service to a telecommunications user in a service area comprising:

an office-side connection system comprising an office interface for communicating with a central office switch, a first cross connect panel and an area interface for communicating with the user in the service area, the first cross connect panel being operable to direct telecommunications signals between the area interface and the office interface;

the area interface connected to a radio link for communicating to the service area, the radio link comprising an office-side radio and an area interface radio;

the area interface radio being connected to an area-side connection system located in the service area, the area-side connection system comprising a second cross-connect panel, a subscriber line being connected to a user equipment for use by said telecommunications user;

the office interface being connected to a line distribution system, said line distribution system comprising:

a second office-side connection system comprising a second office interface for communicating with the central office switch, third cross connect panel and a second area interface for communicating with the user in the service area, the third cross connect panel being operable to direct communications signals between the second area interface and the second office interface; and the second area interface connected to the office interface.

2. The system of claim 1 wherein said office-side connection system includes a cable termination connected to an office link.

3. The system of claim 2 wherein the office link includes an optical link and the cable termination includes an optical/electrical converter system.

4. The system of claim 2 wherein the office link includes a copper cable link and the cable termination includes a next generation digital loop carrier system.

5. The system of claim 1 wherein the office interface includes n-line distribution systems, said n-line distribution systems comprising n-second office-side connection systems.

6. The system of claim 1 further comprising an office-side radio link between the office interface and said second area interface, the office-side radio link comprising a second office-side radio and a second area interface radio.

7. The system of claim 1 further comprising a hut for enclosing said office-side connection system and the office-side radio.

8. The system of claim 1 further comprising a cabinet for enclosing said office-side connection system and the office-side radio.

9. The system of claim 1 further comprising a hut for enclosing the office-side connection system and a cabinet for enclosing the office-side radio.

10. A system for providing telecommunications service to a telecommunications user in a service area comprising:
   a switching system in an end office located in a major service area that includes the service area, the switching system comprising:
      an interface to a plurality of telecommunications user devices connected to each other on a public switched telecommunications network;
      an office-side radio; and
      a telecommunications switch for connecting the telecommunications user devices to a plurality of selected user devices in the service area via the office-side radio; and
   a service area connection system in a distribution enclosure including a hut for enclosing said cross-connect system and a cabinet for enclosing the area-side radio located in the service area, the distribution system comprising a cross-connect panel connected to an area side radio and to subscriber lines extending to the plurality of selected user devices in the service area, the cross-connect panel being operative to select the subscriber lines for communicating the telecommunications signals; and
   a radio link between the office-side and area-side radios for connecting the switching system to the distribution system.

11. The system of claim 10 wherein the distribution enclosure includes a hut for enclosing said area side radio and said cross-connect system.

12. The system of claim 10 wherein the distribution enclosure includes a cabinet for enclosing said area side radio and said cross-connect system.

13. A system for providing telecommunications service to a telecommunications user in a service area comprising:
   a switching system in an end office located in a major service area that includes the service area, the end office including a radio testing controller and a central office alarm sensor, the central office alarm sensor being communicably connected to the radio testing controller, the switching system comprising:
      an interface to a plurality of telecommunications user devices connected to each other on a public switched telecommunications network;
      an office-side radio; and
      a telecommunications switch for connecting the telecommunications user devices to a plurality of selected user devices in the service area via the office-side radio; and
   a service area connection system in a distribution enclosure located in the service area, the distribution system comprising a cross-connect panel connected to an area side radio and to subscriber lines extending to the plurality of selected user devices in the service area, the cross-connect panel being operative to select the subscriber lines for communicating the telecommunications signals, the distribution enclosure including at least one remote alarm sensor; the remote alarm sensor being communicably connected to the radio testing controller; and
   a radio link between the office-side and area-side radios for connecting the switching system to the distribution system.

14. A system for providing telecommunications service to a telecommunications user in a service area comprising:
   a switching system in an end office located in a major service area that includes the service area, the end office including a central testing controller connected to a transmission central office terminal, the transmission central office terminal being communicably connected to a central office radio, the switching system comprising:
      an interface to a plurality of telecommunications user devices connected to each other on a public switched telecommunications network;
      an office-side radio; and
      a telecommunications switch for connecting the telecommunications user devices to a plurality of selected user devices in the service area via the office-side radio; and
   a service area connection system in a distribution enclosure located in the service area, the distribution system comprising a cross-connect panel connected to an area side radio and to subscriber lines extending to the plurality of selected user devices in the service area, the cross-connect panel being operative to select the subscriber lines for communicating the telecommunications signals, the distribution enclosure including a metallic loop testing unit communicably connected to the subscriber side radio, wherein the central testing controller initiates metallic loop testing and receives metallic loop testing reports from the metallic loop testing unit; and
   a radio link between the office-side and area-side radios for connecting the switching system to the distribution system.

15. A method for providing telecommunications service in a service area comprising:
   connecting an office-side radio to an office-side connection system, the office-side connection system being connected to a central office switch;
   connecting an area-side radio to a subscriber connector;

connecting telecommunications devices via a plurality of subscriber lines to the subscriber connector;

creating a radio link between the office-side and the area-side radios; and directing telecommunications signals between the telecommunications devices and the central office switch via the radio link and the subscriber connection;

enclosing the office-side radio in a hut; and enclosing the office-side connection system in a cabinet.

16. The method of claim 15 further comprising:

enclosing the office-side radio and the office-side connection system in a hut.

17. The method of claim 15 further comprising:

enclosing the area-side radio and the subscriber connection in a hut.

18. The method of claim 15 further comprising:

enclosing the area-side radio in a hut; and enclosing the subscriber connection in a cabinet.

19. The method of claim 15 further comprising:

enclosing the area-side radio and the subscriber connection in a cabinet.

* * * * *